United States Patent
Woodhouse et al.

(10) Patent No.: US 9,102,243 B2
(45) Date of Patent: Aug. 11, 2015

(54) SEATING ARRANGEMENT FOR A PASSENGER VEHICLE

(71) Applicant: Ford Global Technologies, LLC, Dearborn, MI (US)

(72) Inventors: David Woodhouse, Bromsgrove (GB); Torsten Gerhardt, London (GB); Robert Spahl, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/076,919

(22) Filed: Nov. 11, 2013

(65) Prior Publication Data

US 2014/0152039 A1 Jun. 5, 2014

(30) Foreign Application Priority Data

Dec. 4, 2012 (GB) .................................... 1221811.1
Oct. 16, 2013 (GB) .................................... 1318280.3

(51) Int. Cl.
*B60N 2/01* (2006.01)

(52) U.S. Cl.
CPC ....................................... *B60N 2/01* (2013.01)

(58) Field of Classification Search
CPC ........................................................ B60N 2/01
USPC ................ 296/37.1, 35.3, 186.1, 187.12, 64, 296/37.12, 191.08, 180.5; 248/635
See application file for complete search history.

(56) References Cited

U.S. PATENT DOCUMENTS

| 1,078,602 | A | * | 11/1913 | Morgan | ........................... 296/64 |
| 1,372,148 | A | * | 3/1921 | Lancia | ..................... 296/203.04 |
| 3,685,854 | A | | 8/1972 | Cadiou | |
| 4,218,092 | A | | 8/1980 | Schach et al. | |
| 5,435,624 | A | | 7/1995 | Bray et al. | |

(Continued)

FOREIGN PATENT DOCUMENTS

DE 19702572 A1 2/1998
DE 19916179 A1 10/2000
(Continued)

OTHER PUBLICATIONS

Madabout News, "MEV announce the new R2," Dec. 12, 2007 (3 pages), Madabout Kitcars.com.

(Continued)

*Primary Examiner* — Pinel Romain
(74) *Attorney, Agent, or Firm* — Vichit Chea; Price Heneveld LLP

(57) ABSTRACT

A seating arrangement for a passenger vehicle includes a vehicular central longitudinal axis. A front seat and a rear seat each include a central longitudinal axis. The respective central longitudinal axes of the front and rear seats are arranged on opposite sides of the vehicular central longitudinal axis in a staggered relationship. The front seat is mounted high and at least one of the seats is positioned such that the central longitudinal axis of the respective seat measured at a rear edge of the respective seat is mounted closer to the vehicular central longitudinal axis than is possible with a symmetrical side-by-side seating arrangement by mounting the respective seat such that a distance measured from the central longitudinal axis of the respective seat at a rear edge of the seat to the vehicular central longitudinal axis is less than half the width of the rear edge of the respective seat.

19 Claims, 9 Drawing Sheets

(56) References Cited

U.S. PATENT DOCUMENTS

| | | | |
|---|---|---|---|
| 5,456,019 A | 10/1995 | Dowell et al. | |
| 5,553,909 A * | 9/1996 | Sacco et al. | 296/186.1 |
| 5,737,845 A | 4/1998 | Marasus | |
| 7,121,623 B2 * | 10/2006 | Fujihara et al. | 297/243 |
| 8,523,281 B2 | 9/2013 | Wahls | |
| 2007/0241235 A1 | 10/2007 | Atchison | |
| 2010/0187850 A1 * | 7/2010 | Murray | 296/64 |
| 2011/0031780 A1 * | 2/2011 | Baumann | 296/187.12 |

FOREIGN PATENT DOCUMENTS

| | | |
|---|---|---|
| DE | 102007060818 A1 | 6/2009 |
| EP | 0669245 A1 | 8/1995 |
| FR | 2826616 A1 | 1/2003 |
| FR | 2934530 A1 * | 2/2010 |
| FR | 2961142 A1 | 12/2011 |
| GB | 1012559 | 8/1964 |
| GB | 1358783 | 7/1974 |
| WO | 8200618 | 3/1982 |
| WO | 9903377 A1 | 1/1999 |
| WO | 2008110814 A2 | 9/2008 |
| WO | 2009083773 A1 | 7/2009 |
| WO | 2013111167 A1 | 8/2013 |

OTHER PUBLICATIONS

Honest John, "Volkswagen unveils XL1 concept car," Jan. 25, 2011 (3 pages), Honestjohn.co.Uk.

Chappell, Dale, "Bugatti Type 23 'Brescia', staggered seating detail, c1926," Feb. 1, 2011 (2 pages), Chappells 10.

Quick, Darren, "Audi urban concept defies conventional categorization," Aug. 9, 2011 (9 pages), Gizmag.

Taylor, Alfred, "Amazing world of three-wheeled vehicles," Sep. 22, 2011 (18 pages), Judgmental.

SAE International, "Devices for Use in Defining and Measuring Vehicle Seating Accommodation," 2014 (1 page).

Jalopy Journal.com, "An Early Factory Hot Rod, The Jesse Vincent Speedster," date unknown (13 pages), Lexis Legal Community.

Early American Automobiles.com, "History of Early American Automobile Industry 1891-1929," date unknown (30 pages).

* cited by examiner

SEATING ARRANGEMENT FOR A PASSENGER VEHICLE

CROSS-REFERENCE TO RELATED APPLICATIONS

The present application is related to co-pending U.S. patent application Ser. No. 14/076,928, filed Nov. 11, 2013, entitled "SEATING ARRANGEMENT FOR A PASSENGER VEHICLE"; co-pending U.S. patent application Ser. No. 14/076,942, filed Nov. 11, 2013, entitled "MOTOR VEHICLE SEAT HAVING AN ARMREST"; co-pending U.S. patent application Ser. No. 14/076,954, filed Nov. 11, 2013, entitled "SEATING ARRANGEMENT FOR A PASSENGER VEHICLE"; co-pending U.S. patent application Ser. No. 14/076,964, filed Nov. 11, 2013, entitled "SEATING ARRANGEMENT FOR A PASSENGER VEHICLE"; and co-pending U.S. patent application Ser. No. 14/076,969, filed Nov. 11, 2013, entitled "SEATING ARRANGEMENT FOR A PASSENGER VEHICLE", all of which are incorporated herein by reference in their entireties.

FIELD OF THE INVENTION

The present invention generally relates to a seating arrangement for a powered passenger vehicle that is particularly suitable for fitment to a vehicle having small overall dimensions.

BACKGROUND OF THE INVENTION

A common problem faced by modern car users is the lack of parking space in cities and large towns. In an effort to provide more parking there has been a trend by local authorities to reduce the size of parking bays so as to provide more parking bays along a given length of road.

SUMMARY OF THE INVENTION

According to one aspect of the present invention, a seating arrangement for a passenger vehicle includes a vehicular central longitudinal axis. The seating arrangement includes a front seat having a central longitudinal axis. A rear seat includes a central longitudinal axis. The respective central longitudinal axes of the front seat and rear seat are arranged on opposite sides of the vehicular central longitudinal axis in a staggered relationship. The front seat is mounted high and at least one of the seats is positioned such that the central longitudinal axis of the respective seat measured at a rear edge of the respective seat is mounted closer to the vehicular central longitudinal axis than is possible with a symmetrical side-by-side seating arrangement by mounting the respective seat such that a distance measured from the central longitudinal axis of the respective seat at a rear edge of the seat to the vehicular central longitudinal axis is less than half the width of the rear edge of the respective seat.

According to another aspect of the present invention, a vehicular seating arrangement for a passenger vehicle includes a front seat and a rear seat. Respective central longitudinal axes of the seats are arranged on opposite sides of a vehicular central longitudinal axis in a staggered relationship. One of the seats is positioned such that a distance measured from the central longitudinal axis of the respective seat to the vehicular central longitudinal axis is less than half the width of the respective seat.

In some known constructions, the width of the passenger compartment Pc is larger than it need be due to the central mounting of the driver's seat and the use of two passenger seats in a side by side arrangement. Even if one of the rear passenger seats is removed the width of the passenger compartment Pc is overly large due to the central mounting of the driver's seat as shown in FIG. 8b.

Therefore in summary there is a need to provide a passenger motor vehicle that is relatively short and narrow so as to permit three of such vehicles to potentially use a single parking bay without causing an obstruction to passing traffic.

It is a first object of the invention to provide a seating arrangement to facilitate the production of a motor vehicle having small overall dimensions.

It is a second object of the invention to provide a motor vehicle utilizing such a seating arrangement so as to permit it to be parked 'nose-in' in a conventional parking bay.

According to a first aspect of the invention there is provided a seating arrangement for a passenger vehicle having a central longitudinal axis, the seating arrangement comprising a front seat and a rear seat having respective longitudinal central axes arranged on opposite sides of the central longitudinal axis in a staggered relationship, wherein at least the front seat is mounted high and at least one of the seats is positioned such that the longitudinal central axis of the respective seat measured at a rear edge of the seat is mounted closer to the central longitudinal axis of the passenger vehicle than is possible with a symmetrical side-by-side seating arrangement by mounting the respective seat a distance measured from the longitudinal central axis of the respective seat at the rear edge of the seat to the central longitudinal axis of the passenger vehicle that is less than half the width of the respective seat.

A seat may be mounted high if a heel contact point referenced H-point height for the respective seat lies in the range of 0.375 m to 0.495 m.

The H-point height lies within a range of 0.4 m to 0.45 m.

The rear seat may be positioned such that the longitudinal central axis of the rear seat measured at a rear edge thereof is mounted closer to the central longitudinal axis of the passenger vehicle than is possible with a symmetrical side-by-side seating arrangement.

The distance of the longitudinal central axes of both seats measured at a rear edge of the respective seat from the central longitudinal axis of the passenger vehicle may be less than half the width of the respective seat.

At least the front seat may have an upright backrest with an inclination relative to vertical of less than 23 degrees.

The front seat may have a heel contact point referenced H-point and the rear seat has a heel contact point referenced H-point and a stagger distance measured in a longitudinal direction of the motor vehicle between the two H-points may lie in the range of 0.3 m to 0.35 m.

The front seat may have a heel contact point referenced H-point and the rear seat may have a heel contact point referenced H-point and the two H-points lie on a common horizontal plane.

The front seat may be a seat for a driver and the rear seat may be a seat for a passenger.

According to a second aspect of the invention there is provided a compact passenger vehicle having a source of motive power and a seating arrangement constructed in accordance with said first aspect of the invention located in a passenger compartment of the vehicle.

The vehicle may have a transversely stepped floor having a front lower part and a rear upper part and both of the seats may be mounted on the rear upper floor.

Respective heel contact point referenced H-point heights for the two seats may be measured relative to the front lower floor.

Both of the seats may have an upright backrest.

These and other aspects, objects, and features of the present invention will be understood and appreciated by those skilled in the art upon studying the following specification, claims, and appended drawings.

BRIEF DESCRIPTION OF THE DRAWINGS

The invention will now be described by way of example with reference to the accompanying drawing of which:

FIG. 7b is a top schematic plan view similar to FIG. 1 but showing a third embodiment of the invention using a transversely stepped floor as shown in FIG. 7a;

DETAILED DESCRIPTION OF THE EMBODIMENTS

Figure 1:
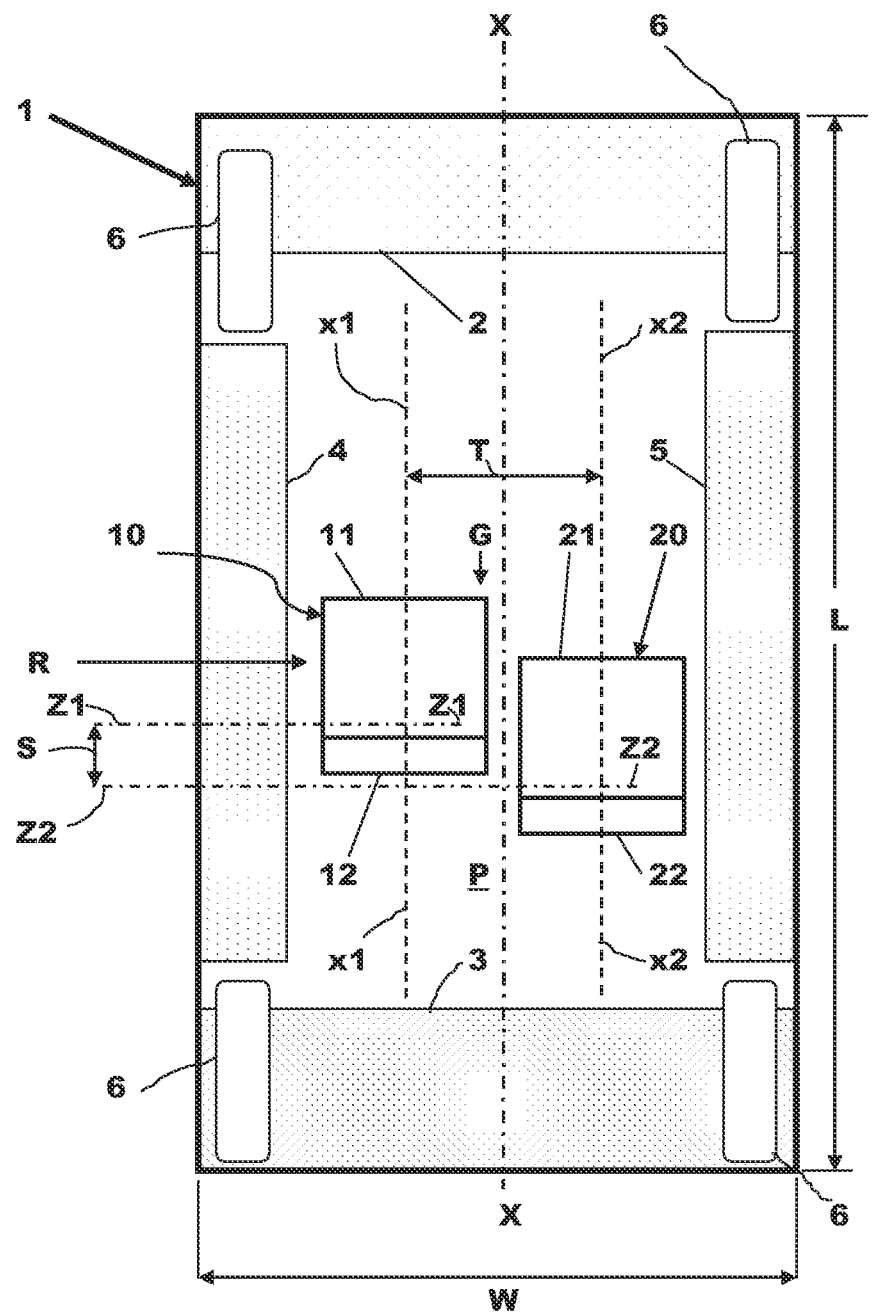
FIG. 1 is a schematic plan view of a motor vehicle having a first embodiment of a seating arrangement according to a first aspect of the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It is generally known to provide a staggered seating arrangement for a motor vehicle that overcomes some of the problems associated with an in-line seating arrangement. One example of the proposed seating arrangement is shown schematically in FIG. 8a. The seating arrangement has a driver's seat mounted forward by a stagger distance "S" of a pair of passenger seats. The driver's seat is mounted on a longitudinal center-line C/L of a passenger compartment Pc of the motor vehicle of which it forms a part. With such an arrangement, the rear seats can be overlapped laterally with the driver's seat a maximum distance $O_{max}$ in order to provide sufficient room for the legs of the passengers to pass by the legs of the driver. The maximum lateral overlap can be increased if the stagger distance "S" is increased, but increasing the stagger distance "S" will normally increase the length of the passenger compartment Pc if the passenger compartment Pc has been optimized for the stagger distance "S" shown in FIG. 8a. A small lateral clearance $L_{min}$ is utilized to the outer side of each of the passenger seats in order to allow passengers to comfortably occupy the rear passenger seats. A width Pw of the passenger compartment Pc is therefore dependent upon the width of each seat, the maximum overlap $O_{max}$ for the stagger distance "S", and the lateral clearance $L_{min}$ required.

Figure 2:
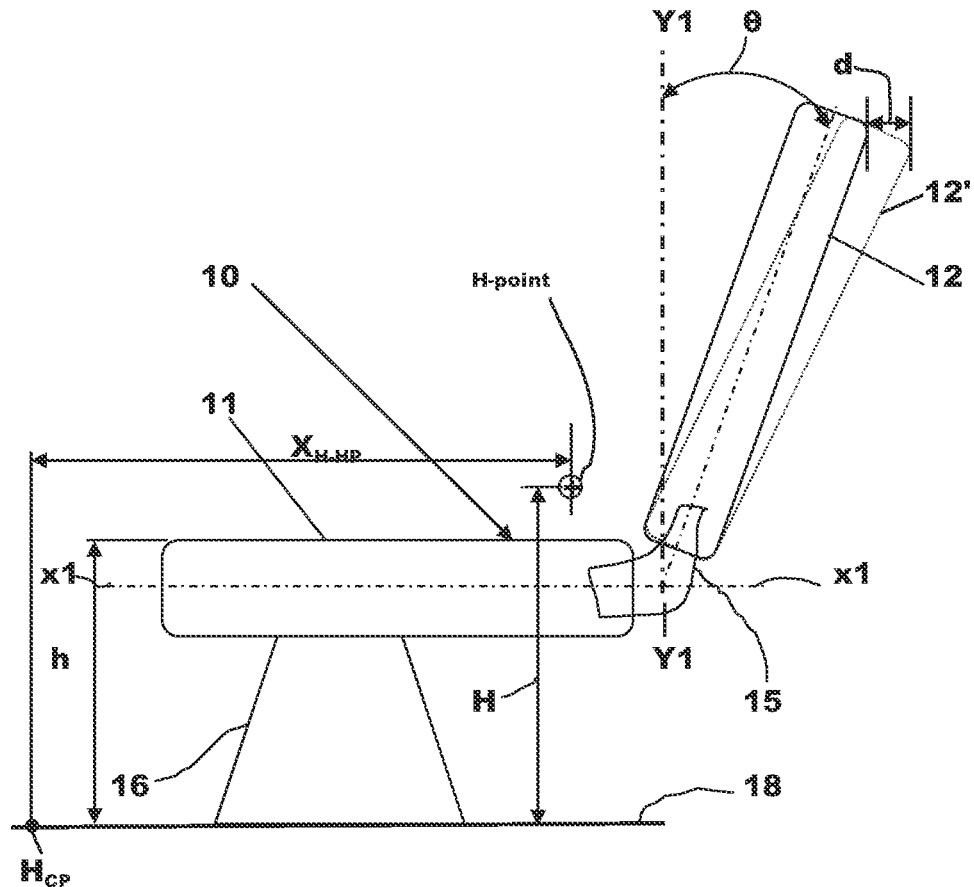
FIG. 2 is a schematic side view on an enlarged scale in the direction of arrow 'R' on FIG. 1 of a front one of the two seats shown in FIG. 1.
Figure 3:
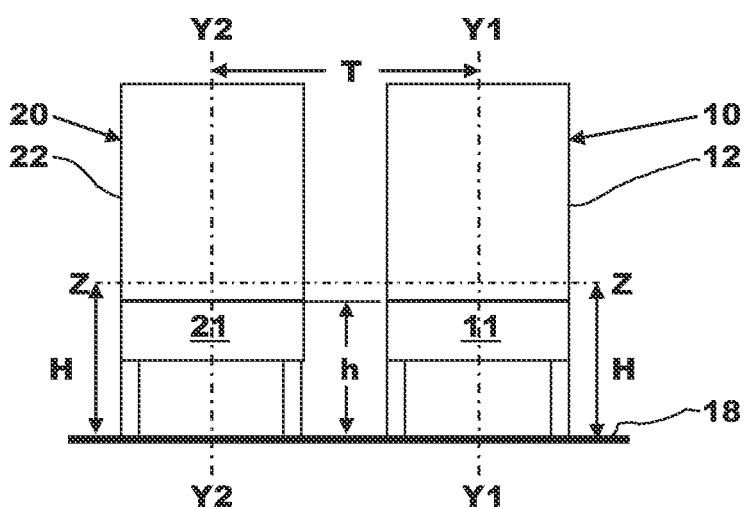
FIG. 3 is a schematic front view in the direction of arrow 'G' on FIG. 1 of the two seats forming the first embodiment seating arrangement.

With particular reference to FIGS. 1-3, there is shown a first embodiment of a seating arrangement for a passenger vehicle in the form of a car 1. The seating arrangement is located in a passenger compartment 'P' of the vehicle 1.

The motor vehicle 1 includes a body structure having a front crush zone 2, two side crush zones 4, 5, a rear 3 crush zone, and has four wheels 6 connected to the body structure via a conventional suspension system. The vehicle 1 has a central longitudinal axis X-X that extends from a front end of the vehicle 1 to a rear end of the vehicle 1.

It will be appreciated that the vehicle 1 could be powered by any known source of motive power including, but not limited to, a combustion engine, an electric motor, or a combination of the same. The source of motive power can be mounted at any convenient location and can drive the vehicle 1 by any suitable form of transmission. It will also be appreciated that the motor vehicle could have three wheels or more than four wheels. The seating arrangement includes a front seat 10 and a rear seat 20 arranged in a staggered relationship to one another. That is to say, the front and rear seats 10, 20 are offset in a longitudinal direction a stagger distance S.

Referring again to the embodiment of FIGS. 1-3, the stagger distance S is measured between two transverse hip pivot axes Z1-Z1 and Z2-Z2, each of which extends through an H-point for the respective seat 10, 20. The H-point is an important characteristic for all vehicle seat designs and is the point that corresponds to the pivot axis of the hips of an occupant of the seat. The H point is used rather than a seat reference point based on an undeflected contour of a seat (seat squab height) because it provides a more accurate predictor of occupant position. The H-point of a seat is approximately 0.095 m higher than the equivalent seat squab height.

The H-point of each seat 10, 20 is defined in terms of a vertical distance H (Y axis) and a horizontal longitudinal distance $X_{H-HP}$ (X axis) measured from a known reference point referred to as the heel contact point $H_{CP}$ (the heel contact point $H_{CP}$ for the front seat 10 is shown in FIG. 2). The heel contact point $H_{CP}$ is the position where a heel of an occupant seated in the seat 10, 20 is located. As the heel of an occupant is resting on a floor 18 of the vehicle 1, the height H is effectively the vertical height of the H-point above the floor 18 assuming, the floor 18 is flat and the heel contact point $H_{CP}$ is the position of contact of a heel of an occupant with the floor 18. The heel contact point $H_{CP}$ represents a reference point from which the vertical position and horizontal longitudinal position of the H-point are measured.

The front seat 10 is mounted in the vehicle 1 forward relative to the rear seat 20 by an amount equal to the stagger distance S. That is to say, the front seat 10 is mounted closer to the front end of the vehicle 1 than the rear seat 20. In this case, the front seat 10 is a seat for a driver of the vehicle 1 and the rear seat 20 is a seat for a passenger of the vehicle 1. A stagger distance S of 0.3 to 0.35 m has been shown to provide a good compromise between vehicle compactness and comfort for the occupants. The longitudinal stagger distance S can conveniently be measured between the H-point for a 95$^{th}$ percentile male front occupant and the H-point for a 95$^{th}$ percentile male rear occupant.

The front seat 10 has a seat squab 11 and a backrest 12 arranged at an obtuse angle with respect to the seat squab 11. The seat squab 11 is attached to the floor 18 of the vehicle 1 by means of a seat mounting structure 16. The seat mounting structure 16 is used to mount the respective seat squab 11 on the floor 18 of the vehicle 1 and may provide the ability to adjust the seat 10 at least in a longitudinal direction of the vehicle 1 so as to suit occupants of differing stature. The backrest 12 is positioned upright, that is to say, it is inclined relative to vertical by a relatively small inclination angle θ. The upright backrest 12 may be a backrest having an inclination relative to vertical less than about 23 degrees. The inclination angle θ is measured relative to a vertical axis Y1-Y2, which is a vertical axis of the vehicle 1, and in the example shown in FIG. 2, is shown passing through a point corresponding to a transverse pivot axis of the backrest 12.

With reference to the embodiment illustrated in FIGS. 1-3, the rear seat 20 has, like the front seat 10, a seat cushion or squab 21 and a backrest 22 arranged at an obtuse angle with respect to the seat squab 11. The seat squab 21 is attached to the floor 18 of the vehicle 1 by means of a seat mounting structure, which may provide at least longitudinal adjustment for the seat 20. The backrest 22 is also positioned upright, that is to say, it is inclined relative to vertical by a relatively small inclination angle. Because both of the hip pivot axes Z1-Z1 and Z2-Z2 fall on a common plane indicated on FIG. 3 by the line Z-Z and the floor 18 is flat, both of the seat squabs 11, 21 are mounted the same distance h from the floor 18. It will be appreciated that the actual height h of the seat squab 11 is different to the height of the H-point, but there is a relationship between the undeflected seat squab height h and the H-point height H. That is to say, if the undeflected seat squab height h is increased, then the H-point height H will also increase.

In order to meet the length restriction for a vehicle 1 to enable nose-in parking, at least the front seat squab 11 needs to be high mounted. The term H-point height as meant herein is the height from a heel contact point $H_{CP}$ to the location of the H-point. Whether a seat is high mounted depends upon the vertical height H between the respective heel contact point $H_{CP}$ and the respective H-point and not the height of the respective seat squab 11, 21 above the floor 18 upon which the seat 10, 20 is mounted, or the height of the seat squab 11, 21 above the road.

By mounting a seat high, the longitudinal distance $X_{H\text{-}HP}$ between the heel contact point $H_{CP}$ and the respective H-point is reduced. This is because a high mounted seat squab results in the lower leg portions (tibia and fibula) of an occupant naturally being more vertically positioned, thereby reducing the horizontal distance $X_{H\text{-}HP}$. This has the effect of allowing a reduction in the distance that needs to be provided between the front seat 10 and a forward end of the passenger compartment P. That is to say, the passenger compartment P can be made shorter.

If both of the seat squabs 11, 21 are mounted higher than would normally be the case for a passenger vehicle, that is to say, the H-point heights H for the two seats 10, 20 are greater than that normally used for a passenger vehicle, both of the occupants will have better forward visibility due to their higher seating position relative to the floor 18 of the vehicle 1. This is particularly advantageous in city or urban motoring where advance warning of a pedestrian in the road greatly improves safety.

It is normal for passenger vehicle use to mount the seats 10, 20 such that an H-point height is less than about 0.35 m, and typically the H-point height for a passenger vehicle will be about 0.3 m.

Furthermore, by using two high mounted seat squabs 11, 21, an upright backrest position can be used for both seats 10, 20 without causing discomfort to the users of the seats 10, 20. This is because when sitting on a high mounted seat squab, the upper leg portions (femurs) of an occupant tend to be more horizontally disposed than is the case with a low mounted seat squab, which permits a more upright backrest to be used without reducing the angle between the upper leg portions (femurs) of the occupant and the spine of the occupant to an unacceptable amount.

The use of an upright backrest 12 for at least the front seat 10 has the advantage that the occupant of the rear seat 20 does not feel so impacted upon by the close presence of the backrest 12 of the front seat 10. Compare the upright backrest 12 shown on FIG. 2 with the normally inclined backrest 12' (shown in dotted outline). As can be seen with reference to FIG. 2, the back of the upright backrest 12 is a distance d further from an occupant of the rear seat 20 than would be the case with a normally inclined backrest as indicated by the backrest 12'. A normally inclined backrest is one that is inclined more than 23 degrees.

By using a small backrest inclination angle θ for both seats 10, 20, ingress and egress from the vehicle 1 can be improved for certain vehicle designs.

For example, if a door aperture of such a vehicle partly covers the rear mounted passenger seat 20, it is difficult for the passenger to exit the vehicle. To leave the vehicle 1 the passenger will need to lean their body forward to pass through the door aperture. On seats with a high backrest inclination angle θ, the forward body has a significant body forward movement during which there is a risk that the passenger will impact against the backrest 12 of the front seat 10. To avoid this, the longitudinal distance between the front and rear seats 10, 20 needs to be greater than if an upright backrest having a small backrest inclination angle θ is used. This is because with an upright backrest 22, the passenger already has quite a vertical body position and so does not need to move forward so much.

It will be appreciated that the backrests 12, 22 could be inclined by differing amounts, in which case, the rear seat backrest 22 is more inclined than the front seat backrest 12 as this provides additional rear passenger space. In such a case both of the backrests 12, 22 could be upright or the front seat backrest 12 is upright with the rear seat backrest 22 being inclined so that it is not upright, that is to say, it is inclined more than 23 degrees. By mounting both seat squabs 11, 21 high with a heel to floor contact point to H-point height H in a general high mounted seat range of 0.375 m to 0.495 m, but in a range of 0.4 to 0.45 m, a good result can be achieved.

Although it would possible to mount a seat with an H-point higher than the upper limit of the general range, that is to say, greater than 0.495 m, there are several disadvantages with a seat so mounted. Firstly, moving an occupant higher, raises their center of gravity with a negative effect on the transverse stability of the vehicle during cornering and also occupants of below average height may find it difficult to sit comfortably because the seat squab is mounted too high.

If a seat is mounted lower than the lower limit of the general range, that is to say, lower than 0.375 m, then an upright backrest cannot be comfortably used unless the lower leg portions of the occupant are extended forwardly, thereby greatly increasing the heel to H-point horizontal distance.

To provide a comfortable seating position for a 95$^{th}$ percentile male occupant, the mounting of a seat squab at a height h that provides a heel contact point $H_{CP}$ (floor) to H-point height H in the range of 0.4 m to 0.45 m has been found to produce a particularly good result. Therefore, by using an H-point height H within the above high mounted seat ranges, an upright backrest can be used while maintaining comfort for an occupant of the seat.

Each of the seats 10, 20 has a respective central longitudinal axis x1-x1, x2-x2 arranged in this case parallel to the central longitudinal axis X-X of the vehicle 1. The central longitudinal axes x1-x1, x2-x2 pass through respective mid-points of the seat squabs 11, 21 at a rear edge of the respective seat squab 11, 21 so that half of the width of the respective seat squab 11, 21 lies on each side of the respective mid-point. In order to minimize vehicle width W, a transverse distance or spacing T between the central longitudinal axes x1-x1; x2-x2 of the two seats 10, 20 needs to be kept small.

Although in FIG. 1 the two seats 10, 20 are shown spaced apart so that there is no overlap between the seats 10, 20, in practice, there will be some overlap between the two seats 10, 20 and the two seats 10, 20 may be overlapped in both a longitudinal and a transverse direction in order to produce a very compact arrangement.

At least one of the seats 10, 20 is positioned such that its central longitudinal axis x1-x1; x2-x2 as measured at a rear edge of the respective seat 10, 20 is mounted closer to the central longitudinal axis X-X of the passenger vehicle 1 than would be possible with a symmetrical side-by-side seating arrangement. This is achieved by mounting the respective seat 10, 20 a distance, measured from the central longitudinal axis of the respective seat x1-x1; x2-x2 at a rear edge of the respective seat 10, 20 to the central longitudinal axis X-X of the passenger vehicle 1, that is less than half the width of the respective seat 10, 20.

For example, if the width of the respective seat 10, 20 is 0.44 m, then the distance from the central longitudinal axis of the respective seat 10, 20 to the central longitudinal axis X-X of the passenger vehicle 1 would be less than 0.22 m.

The width of a seat 10, 20 in this case is the width of the respective seat squab 11, 21 and the rear edge of a seat 10, 20 is the rear edge of the respective seat squab 11, 21.

In some embodiments, both seats 10, 20 have their respective central longitudinal axes x1-x1; x2-x2 at a rear edge of each seat 10, 20 positioned from the central longitudinal axis X-X of the passenger vehicle 1 a distance that is less than half the width of the respective seat 10, 20.

For example, if the width of both seats 10, 20 is 0.44 m, the distance from the central longitudinal axis of each seat 10, 20 at a rear edge of the respective seat 10, 20 to the central longitudinal axis X-X of the passenger vehicle 1 would be less than 0.22 m. The seat squab 21 of the rear mounted seat 20 may be shaped so as to avoid contact with the seat squab 11 of the mounted front seat 10.

One advantage of the use of a high mounted seat is that if the seat 10, 20 is fitted with a fore-aft position adjuster so as to permit the seat 10, 20 to be moveable in a longitudinal direction of the passenger vehicle 1, the H-point height of the seat 10, 20 can remain substantially constant irrespective of the longitudinal position of the seat 10, 20 within the passenger vehicle 1. That is to say, there is no need to provide a seat height adjuster to the seat 10, 20, thereby saving cost. Therefore, if both of the seats 10, 20 have fore-aft adjusters and are high mounted, then the cost of two seat height adjusters can potentially be saved.

However, if fore-aft adjustment is provided, a mechanism is provided to prevent users of the passenger vehicle 1 from reducing the stagger distance S below a lower limit, such as for example 0.3 m. In the situation where the front seat 10 can move in a fore-aft direction, this can be achieved by restricting the rearward travel of the front seat 10. In the case where both seats 10, 20 can move, then an interlock or other means is provided to prevent the rear seat 20 from being moved too close to the front seat 10 or vice-versa.

In one embodiment of the present invention, a vehicle 1 can meet current crash standards while having a length L of less than 2.6 m and a width W of less than 1.35 m, the stagger distance S was 0.34 m, the seat squabs 11, 21 were positioned at a height h above the floor 18 to produce heel contact point $H_{CP}$ (floor) to H-point height H of 0.43 m, the backrests 12, 22 were inclined at 19 degrees to the vertical and the central longitudinal axes x1-x1 and x2-x2 of the two seats 10, were spaced apart a distance T of 0.39 m.

Figure 4:
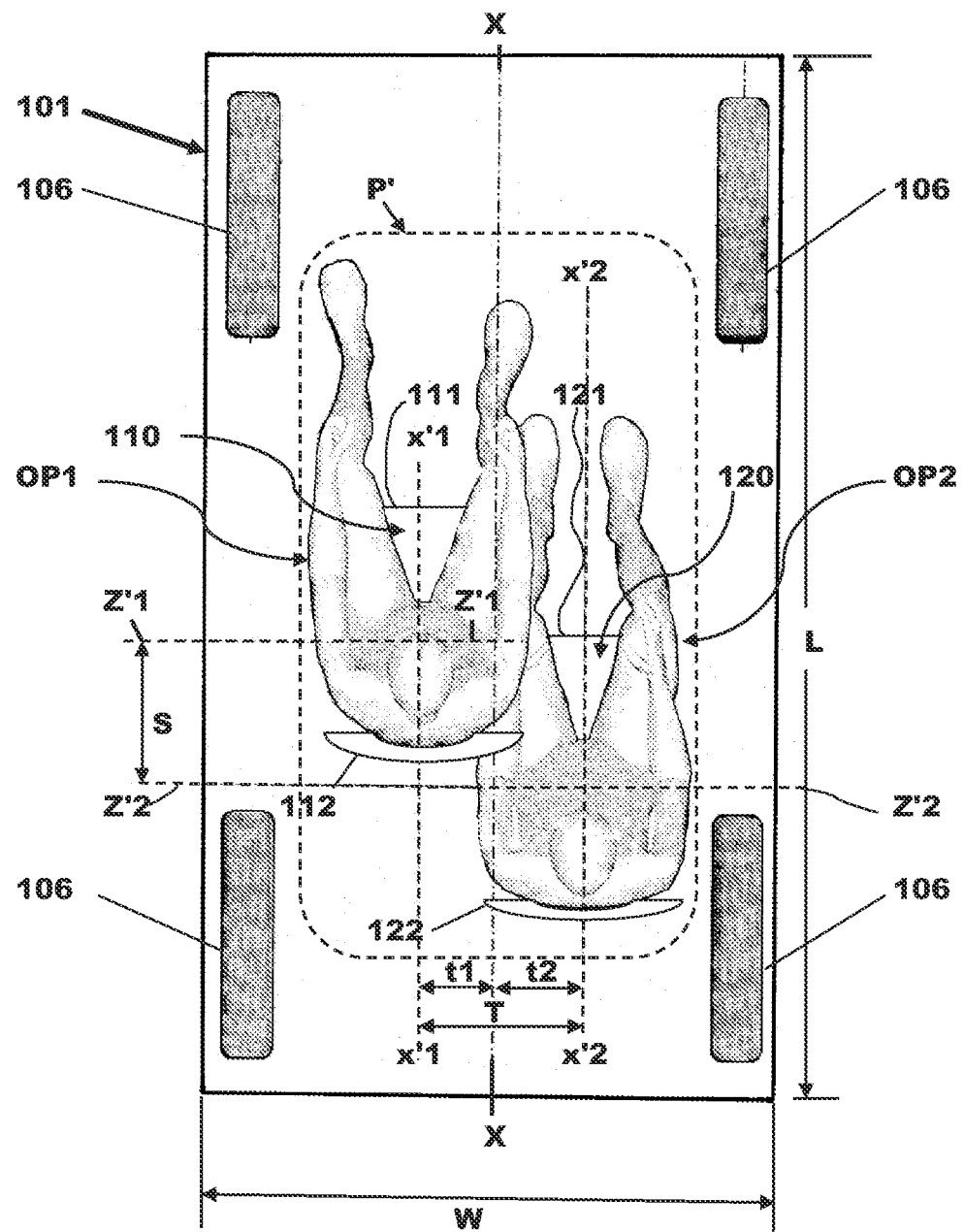
FIG. 4 is a top schematic plan view similar to FIG. 1 but showing a second embodiment of a seating arrangement with two occupants in an in use position.
Figure 5:
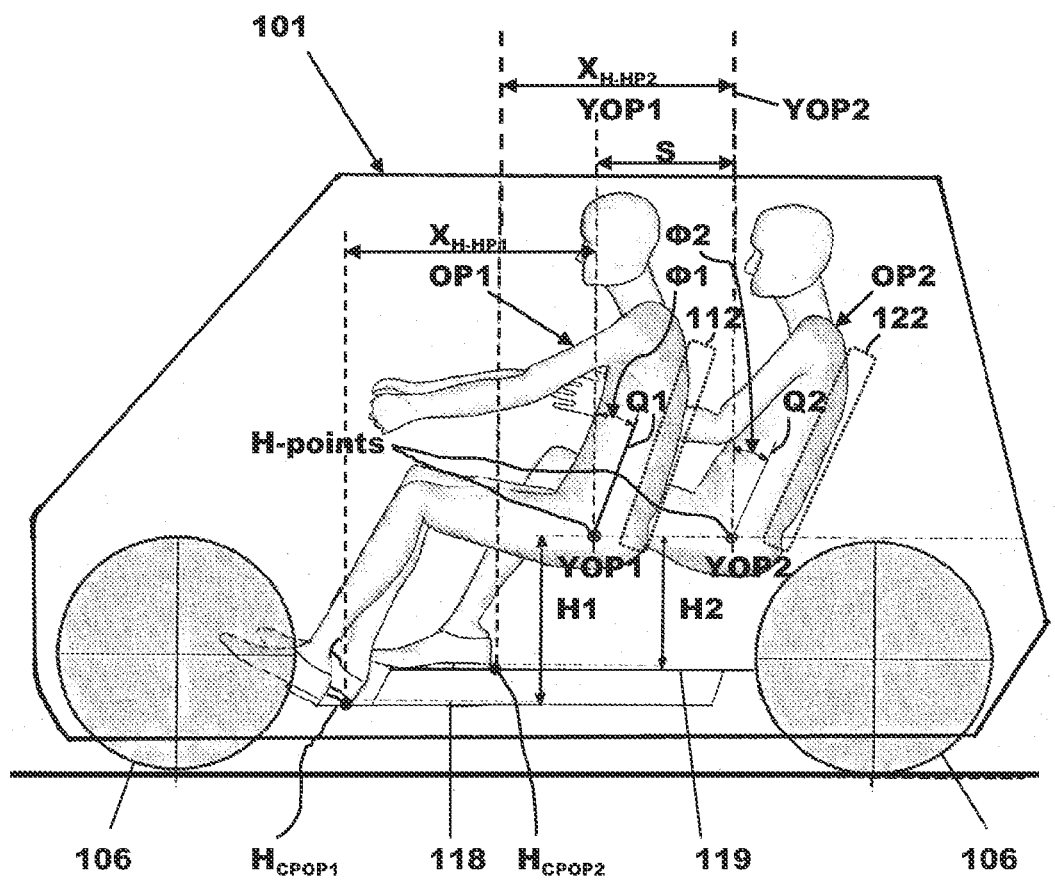
FIG. 5 is a side view of the seating arrangement shown in FIG. 4 in which the seat squabs are omitted for clarity.
Figure 6:
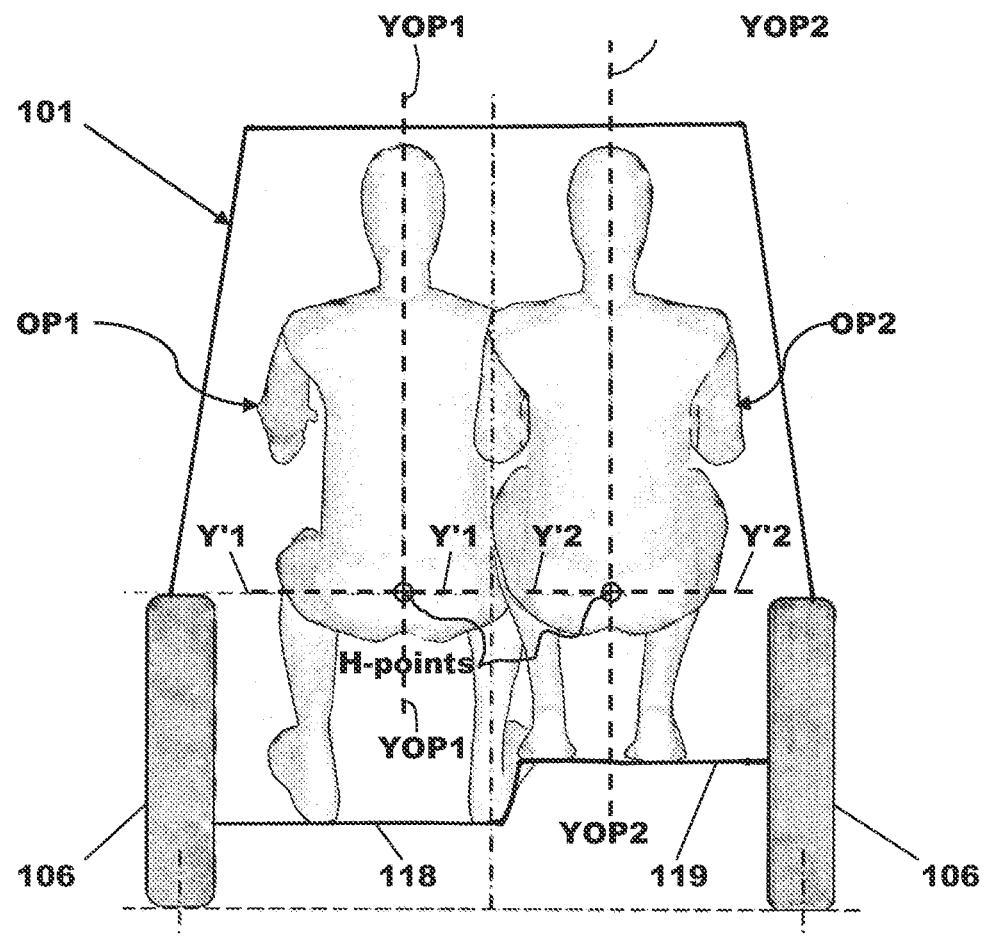
FIG. 6 is a rear view of the occupants shown in FIGS. 4 and 5 with the seats omitted for clarity.

With particular reference to FIGS. 4-6, there is shown a second embodiment of a seating arrangement for accommodating two occupants OP1, OP2 in a powered passenger vehicle 101, which has a longitudinally stepped floor having a lower level 118 and an upper level 119.

The vehicle 101 has a body structure defining front, rear, and crush zones so as to comply with current crash standards. The vehicle 101 also has a passenger compartment P' in which the seating arrangement is located and four road wheels 106. The vehicle 101 has a longitudinal length L and a transverse or lateral width W.

The vehicle 101 has a central longitudinal axis X-X that extends from a front end of the vehicle 101 to a rear end of the vehicle 101. As before, the vehicle 101 can be powered by any known source of motive power including, but not limited to, a combustion engine, an electric motor, or a combination of the same. The source of motive power can be mounted at the front of the vehicle 101 or at the rear of the vehicle 101 and can drive the vehicle 101 by any suitable form of transmission. A conventional suspension system is used to connect the four wheels 106 to the body structure of the vehicle 101.

The seating arrangement includes front and rear seats 110, 120, each of which has a respective central longitudinal axis x'1-x'1, x'2-x'2 arranged parallel to the central longitudinal axis X-X of the vehicle 101.

The front and rear seats 110, 120 are arranged in a staggered relationship to one another. That is to say, the front and rear seats 110, 120 are offset in a longitudinal direction of the vehicle 101 by a seat stagger distance S measured between two transverse hip pivot axes Z'1-Z'1 and Z'2-Z'2, each of which extends through an H-point for the respective seat 110, 120.

As before, a stagger distance S of between 0.3 m and 0.35 m has been shown to provide a good compromise between vehicle compactness and comfort for the occupants and, in the example shown, the seat stagger distance S is 0.35 m.

The front seat 110 is mounted in the vehicle 101 forward relative to the rear seat 120 by an amount equal to the stagger distance S. That is to say, the front seat 110 is mounted closer to the front end of the vehicle 101 than the rear seat 120. In this case, the front seat 110 is a seat for a driver OP1 of the vehicle 101 and the rear seat 120 is a seat for a passenger OP2 of the vehicle 101.

The front seat 110 has a seat cushion or squab 111 and a backrest 112 (shown in dotted outline on FIG. 5) arranged at an obtuse angle with respect to the seat squab 111 and the seat squab 111 is attached to a floor 118 of the vehicle 101 by means of a seat mounting structure. The seat mounting structure mounts the respective seat squab 111 in a high position on the floor 118 of the vehicle 101 and may provide the ability to adjust the seat 110 at least in a longitudinal direction of the vehicle 101 so as to suit occupants of differing height.

As previously discussed, one advantage of the use of a high mounted seat 110 is that there is no need to provide a seat height adjuster for the seat 110, thereby saving cost. However, as before, if a fore-aft adjustment is provided for the front seat 110, a mechanism should be provided to prevent users of the passenger vehicle 1 from reducing the stagger distance S below a lower limit, such as for example 0.3 m.

In the situation where the front seat 110 can move in a fore-aft direction, this can be achieved by restricting the rearward travel of the front seat 110 to a position where the minimum stagger distance S is not compromised.

A high mounted seat is one having a seat squab that positions the respective H-point for the seat within a predefined vertical height range such that the H-point height is greater than 0.375 m and lies within a general high mounted seat range of 0.375 m to 0.495 m and within a range of 0.4 m to 0.45 m. The equivalent undeflected seat squab heights are 0.28 to 0.4 m for the general range and 0.305 to 0.355 m for the desired range.

As before, the H-point of the seat 110 is the position of the respective hip pivot axis $Z'1$-$Z'1$ defined in terms of a vertical distance H1 (Y axis) measured from a known reference point and a horizontal distance $X_{H-HP1}$ (X axis) measured from the same reference point. The reference point $H_{CPOP1}$ is the position of contact of a heel of the occupant OP1 with the underlying floor 118. Because the heel of the occupant OP1 is resting on the flat floor 118 of the vehicle 101, the height H1 is effectively the vertical height of the H-point above the floor 118.

The use of the high mounted seat squab 111 permits the backrest 112 of the front seat 110 to be positioned upright, that is to say, the backrest 112 is inclined relative to vertical by a relatively small inclination angle $\Phi 1$. As before, the upright backrest 112 may have an inclination relative to vertical less than 23 degrees, and in this case, the backrest inclination angle $\Phi 1$ is set to 19 degrees.

In the example shown, the backrest inclination angle $\Phi 1$ is measured relative to a vertical axis YOP1-YOP1, which is a vertical axis of the vehicle 101 that extends vertically up from the H-point of the front seat 110. The backrest inclination angle $\Phi 1$ is shown measured between the vertical axis YOP1-YOP1 and a plane Q1 that is arranged parallel to the respective backrest 112.

The rear seat 120 has a seat squab 121 and a backrest 122 (shown in dotted outline on FIG. 5) arranged at an obtuse angle with respect to the seat squab 121 and the seat squab 121 is attached to a floor 119 of the vehicle 101 by means of a seat mounting structure.

The seat mounting structure mounts the respective seat squab 121 in a low or normal position on the floor 119 of the vehicle 101 and may provide the ability to adjust the seat 110 at least in a longitudinal direction of the vehicle 101 so as to suit occupants of differing height, in which case a mechanism is utilized to prevent the minimum value of stagger distance S from being compromised. That is to say, a minimum stagger distance of 0.3 m should be maintained at all times. A low mounted seat is one having a seat squab that positions the respective H-point for the seat below the predefined vertical height range for a high mounted seat, that is to say, less than 0.375 m.

As before, the H-point of the seat 120 is the position of the respective hip pivot axis $Z'2$-$Z'2$ defined in terms of a vertical distance H2 (Y axis) measured from a known reference point and a horizontal distance $X_{H-HP2}$ (X axis) measured from the same reference point. The reference point in this case is the position of contact $H_{CPOP2}$ of a heel of the occupant OP2 with the underlying floor 119. Because the heel of the occupant OP2 is resting on the flat floor 119 of the vehicle 101, the height H2 is effectively the vertical height of the H-point above the floor 119.

It will be appreciated that the actual height of the seat squab 121 is different to the H-point height H2 of the respective H-point, but there is a fixed relationship between the seat squab height and the H-point height H1. That is to say, if the height of the seat squab 121 is increased, then the respective H-point height H2 will also increase by the same amount.

The backrest 122 is not positioned upright, that is to say, the backrest 122 is inclined relative to vertical by an inclination angle $\Phi 2$ that is above the range defined as being upright and, as before, the range is an inclination relative to vertical of less than about 23 degrees. In the example shown, the backrest 122 is inclined with an inclination angle $\Phi 2$ set at 25 degrees.

The backrest inclination angle $\Phi 2$ is measured relative to a vertical axis YOP2-YOP2, which is a vertical axis of the vehicle 101 that extends vertically up from the H-point of the rear seat 120. The backrest inclination angle $\Phi 2$ is shown measured between the vertical axis YOP2-YOP2 and a plane Q2 that is arranged parallel to the respective backrest 122.

Each of the hip pivot axes $Z'1$-$Z'1$ and $Z'2$-$Z'2$ passes through the H-point for the respective seat 110, 120 and falls on a common horizontal plane even though the respective H-point heights H1, H2 for the two seats 110, 120 are different, one corresponding to the high mounted seat squab 111 and one to the low mounted seat squab 121. This is due to the fact that the floor of the vehicle 101 is stepped such that the floor 118 on the driver's side of the vehicle 101 is lower than the floor 119 on the passenger's side. Depending upon the height of the step between the two floors 118, 119 and the magnitudes of the respective H-point heights H1, H2 the two H-points will either fall on a common horizontal plane as shown or be vertically displaced.

If the two H-point heights H1, H2 do fall on the same common horizontal plane, the two occupants OP1, OP2 then sit at approximately the same height.

One of the advantages of using a longitudinally stepped floor 118, 119 is that it allows the passenger seat 120 to be mounted low, but have an H-point H2 lying on a common plane with the H-point H1 of the driver's seat 110, which is mounted high. The use of a low mounted seat 120 for the passenger is advantageous if the backrest 122 is not upright because with a more reclined backrest 122, it is more comfortable for the passenger if a low mounted seat 120 is used.

In the case of the rear seat 120, it is possible to use an H-point height H2 that is below that defined as being high mounted because the rear seat 120 is mounted further away from the front of the passenger compartment. It is therefore not so critical to reduce the longitudinal distance $X_{H-HP2}$ between the heel contact point $H_{CPOP2}$ and the H-point for the rear seat 120 in order to produce a short vehicle.

Whether the rear seat 120 can be low mounted will depend upon whether an upright backrest 122 must avoid contact with a rear wall of the passenger compartment P'. If so, then the rear seat 120 will generally be mounted high to allow the comfortable use of a small backrest inclination angle $\Phi 2$ and, in such a case, a longitudinally stepped floor 118, 119 is not utilized.

In order to meet length restrictions to enable nose-in parking, a high mounted front seat squab 111 may be utilized. As before, by mounting the front seat squab 111 higher than would normally be the case for an occupant of the respective seat 110, normally a driver, has better forward visibility due to their higher seating position and this is particularly advantageous in city or urban motoring where advance warning of a pedestrian in the road greatly improves safety.

By using a high mounted seat squab 111, an upright position for the backrest 112 can be used without causing discomfort to an occupant OP1 of the seat 110. The use of an upright backrest 112 for the front seat 110 has the advantage that the occupant OP2 of the rear seat 120 does not feel so impacted upon by the close presence of the backrest 111 of the front seat 110. This feeling of space can be further improved if there is sufficient room in the passenger compartment P' by positioning the backrest 122 of the rear seat 120 in a more inclined position than the backrest 112 of the front seat 110. For example, by using an upright front seat backrest 112 with an inclination angle $\Phi 1$ of 19 degrees and a less upright rear seat backrest 122 with an inclination angle $\Phi 2$ of 25 degrees, the rear seated passenger OP2 will feel less claustrophobic and has more space.

As before, a transverse distance or spacing T between the longitudinal central axes x'1-x'1 and x'2-x'2 of the two seats 110, 120, respectively, needs to be kept small in order to minimize vehicle width W. As shown on FIG. 4, each of the longitudinal central axes x'1-x'1, x'2-x'2 of the seats 110, 120 is offset from the central longitudinal axis X-X of the vehicle 101 by a distance t1, t2, respectively. The two offsets t1, t2 form in combination the transverse spacing T between the longitudinal central axes x'1-x'1, x'2-x'2 of the two seats 110, 120. The offsets t1, t2 are measured at a rear edge of the respective seat 110, 120.

In the example shown in FIG. 4, the offset t2 is greater than the offset t1, but this need not be the case, and the offsets t1, t2 could be identical or the offset t1 could be more than the offset t2.

However, in all cases, at least one of the seats 110, 120 is positioned such that a central longitudinal axis x'1-x'1; x'2-x'2 of the respective seat 110, 120 measured at a rear edge of the respective seat 110, 120 is mounted closer to the central longitudinal axis X-X of the passenger vehicle 101 than would be possible with a symmetrical side-by-side seating arrangement. This is achieved by mounting the respective seat 110, 120 an offset distance t1 or t2, measured from the central longitudinal axis x'1-x'1; x'2-x'2 at a rear edge of the respective seat 110, 120 to the central longitudinal axis X-X of the passenger vehicle 101, that is less than half the width of the respective seat 110, 120. The central longitudinal axes x'1-x'1; x'2-x'2, as before, pass through a mid-point of the respective seat squab 111, 121 at a rear edge of the seat squab 111, 121.

In a case where a respective seat 110, 120 has a width of 0.44 m, then it is offset from the central axis X-X no more than 0.22 m.

In one embodiment of the vehicle 101 that could meet current crash standards, the floor to H-point height of the front seat 110 is 0.43 m, the H-point of the rear seat 120 is 0.35 m, the backrest 112 is inclined at 19 degrees to the vertical, the backrest 122 is inclined at 25 degrees to the vertical and the central longitudinal axes x'1-x'1, x'2-x'2 of the two seats 110, 120 are spaced apart a distance 0.39 m from one another.

Figure 7A:
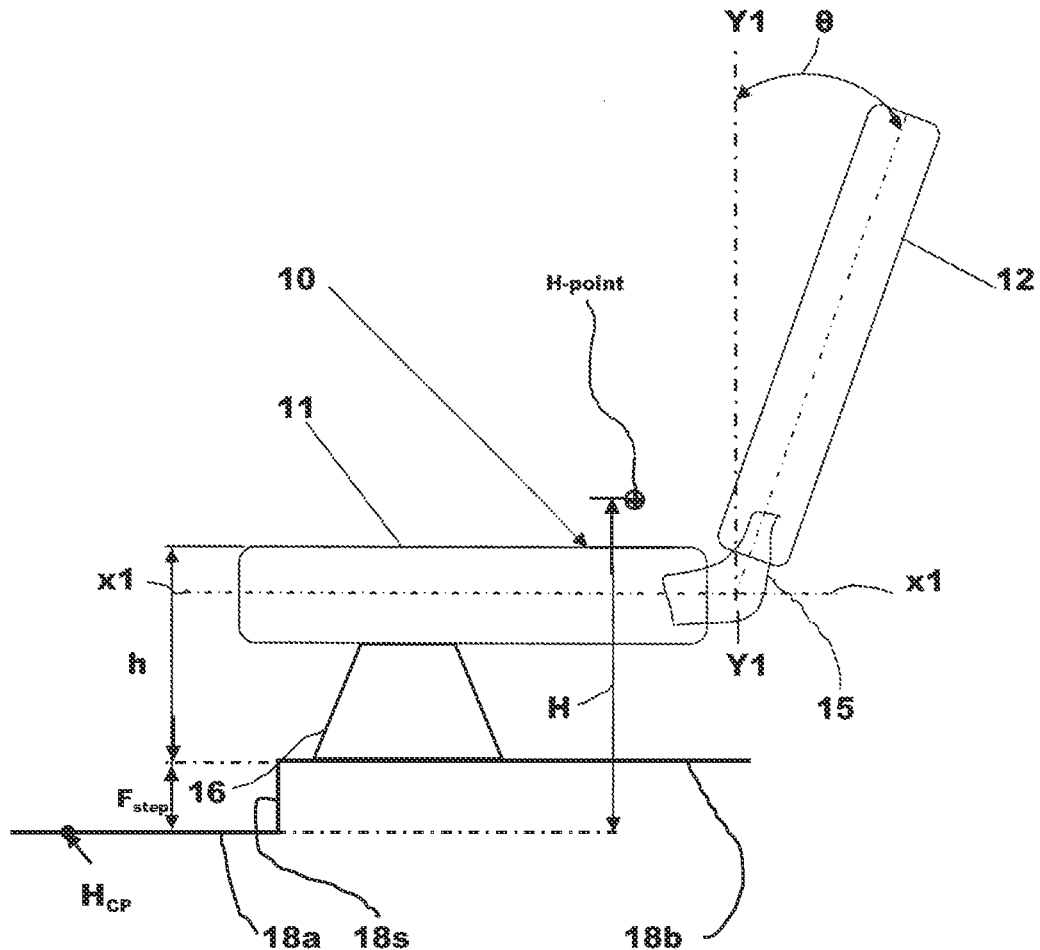
FIG. 7a is a side view similar to that of FIG. 2 but showing how the invention can be applied to a vehicle having a transversely stepped floor.

With particular reference to FIG. 7a, the invention can be applied to the seat shown in FIG. 2 when the vehicle has a transversely stepped floor.

The seat 10 is in most aspects identical to that shown in FIG. 2. The primary difference between this embodiment and that shown in FIG. 2 is that, even though the H-point height H is identical to that shown in FIG. 2, the seat support 16 is not as tall as is the case in the embodiment shown in FIG. 2, that is to say, the seat height h is less.

The floor has a step 18s of height $F_{step}$ between a lower floor 18a and an upper floor 18b upon which the seat 10 is mounted. The height h of the seat squab 11 is less by an amount equal the height $F_{step}$ of the step between the lower floor 18a and the upper floor 18b than the height of the seat squab shown in FIG. 2 to compensate for the step while providing the same H-point height H as that shown in FIG. 2. That is to say, the height H in a vertical direction between the heel contact point $H_{CP}$ (which lies on the lower floor 18a) and the H-point is the same as that shown in FIG. 2 and so that the seat squab 11 is still high mounted even though the actual height h of the seat squab 11 above the floor 18b would suggest otherwise.

Therefore, whether a seat is high mounted depends upon the vertical height H between the respective heel contact point $H_{CP}$ and the respective H-point and not the height h of the respective seat squab above the floor upon which the seat is mounted nor the height of the seat squab above the road. Therefore, a seat height value is deceptive with respect to seating position in the case where the seat and the feet of an occupant rest on floors of differing height. This is one reason why a heel contact point referenced H-point is desired to a simple seat height value.

Figure 7B:
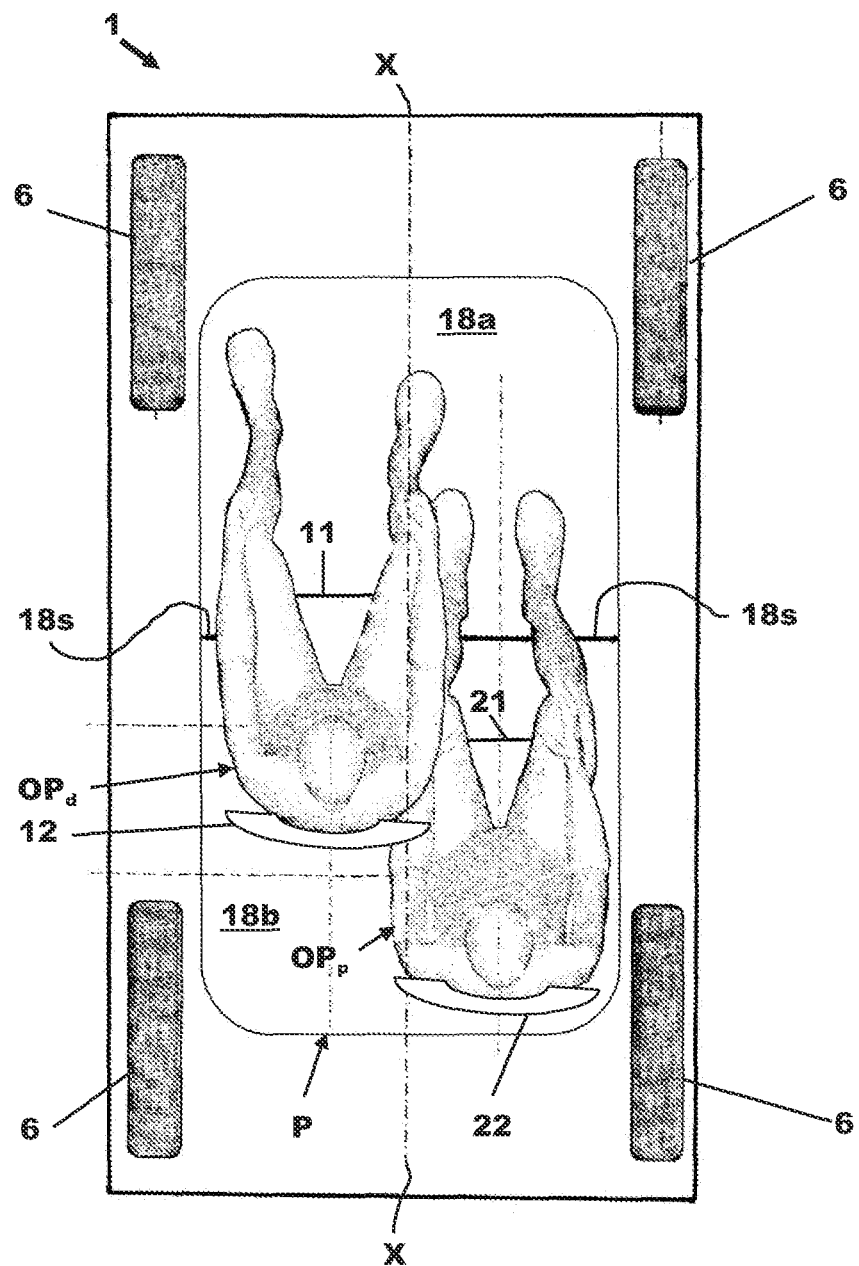

FIG. 7b shows a top schematic plan view of a third embodiment of a seating arrangement using a transversely stepped floor of the type shown in FIG. 7a.

As before, the compact motor vehicle 1 has four wheels and a source of motive power. A seating arrangement similar to that shown in FIG. 1 is located within the passenger compartment P for accommodating a driver $OP_d$ and a passenger $OP_p$ on front and rear seat squabs 11, 21 and having front and rear seat backrests 12, 22.

The front part of the passenger compartment P has a front floor 18a upon which the feet of both the driver $OP_d$ and the passenger $OP_p$ rest and from which the respective H-point height for each of the seats is determined.

The rear part of the passenger compartment P has a rear floor 18b upon which the two seats are mounted. The rear floor 18b is raised up from the front floor 18a there being a step 18s defining the change in level between the two parts of the floor 18a, 18b.

Both of the seats are high mounted, that is to say, their respective H-point heights lie within the range of 0.375 m to 0.495 m. Both of the seats have in the example shown an upright backrest 12, 22 but the backrest 22 of the passenger seat need not be upright.

One advantage of the use of a laterally stepped floor having a higher rear floor 18b is that more space is available below the rear floor to package other components of the motor vehicle 1, such as for example parts of the drive train or a spare wheel or a fuel tank. If a conventional flat floor is used with the same height as the raised rear floor 18b while using a high mounted seat, then the occupant of such a seat would be sitting very high (a high seating position) with respect to a road surface upon which the motor vehicle 1 is resting. This high seating position would raise the center of gravity of the occupants and will make the motor vehicle 1 laterally less stable. By using a laterally stepped floor, all of the advantages of using a high mounted seat can be gained without incurring the problems associated with a high seating position.

Figure 8A:
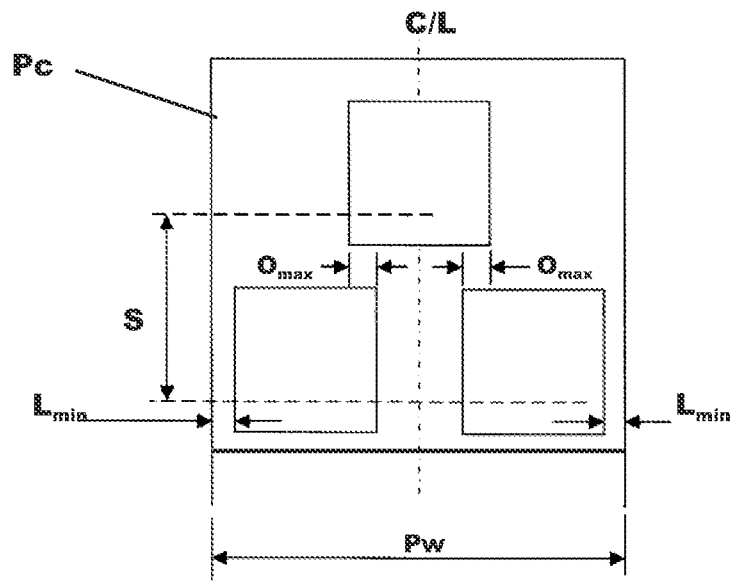
FIG. 8a is a schematic plan view of a prior art seating arrangement.
Figure 8B:
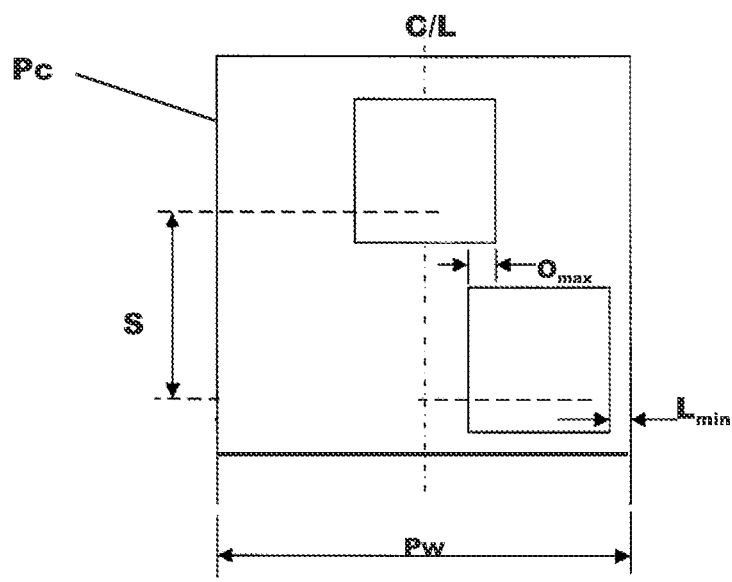
FIG. 8b is a schematic plan view of the prior art seating arrangement shown in FIG. 8a adapted as a two seat arrangement.
Figure 9:
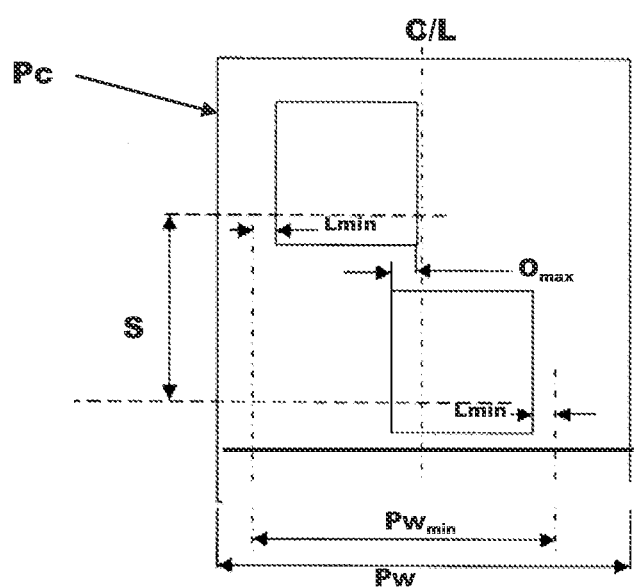
FIG. 9 is a schematic plan view of a seating arrangement according to the invention for comparison with the embodiments shown in FIGS. 8a and 8b.

With reference to FIG. 9, the advantage of a seating arrangement constructed according to the invention compared to the prior art seating arrangement shown in FIGS. 8a and 8b is shown schematically by using seats of the same dimension positioned with the same spacing to that proposed in the prior art.

The passenger compartment Pc is shown the same size as that appearing in FIGS. 8a and 8b. Assuming that the same small lateral clearance $L_{min}$ is provided to the outer side of each seat then it can be seen that the width of the passenger compartment could be reduced to width $Pw_{min}$ if a seating arrangement proposed in accordance with this invention is used. That is to say, using a passenger compartment Pc of the same length as that used in FIGS. 8a and 8b the width of the passenger compartment can be reduced by $(Pw-Pw_{min})$ m.

Although the squabs of the two seats are shown in the figures as simple rectangles, it will also be appreciated that this need not be the case and one or more of the squabs could be shaped to assist with meeting a seat stagger distance and lateral seat spacing. For example, a front inboard corner of the rear seat squab and a rear inboard corner of the front seat squab may be relieved or cutaway to facilitate the meeting of a desired seat spacing. As yet another example, at least one of the seat squabs could have curved sides or be of a truncated oval shape so that it is narrower at respective front and rear edges than it is in a central portion between the front and rear edges.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is for illustrative purposes. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A seating arrangement for a passenger vehicle having a vehicular central longitudinal axis, the seating arrangement comprising:
   a front seat having a central longitudinal axis; and
   a rear seat having a central longitudinal axis, wherein the respective central longitudinal axes of the front seat and rear seat are arranged on opposite sides of the vehicular central longitudinal axis in a staggered relationship, wherein the front seat is mounted such that the distance between the front seat and a vehicle floor is larger than the distance between the rear seat and the vehicle floor and both the front and rear seats are positioned such that a distance measured from the central longitudinal axis of the respective seat at a rear edge of the seat to the vehicular central longitudinal axis is less than half the width of the rear edge of the respective seat.

2. The seating arrangement of claim 1, wherein the front seat is mounted such that a distance measured between a heel contact point and a referenced H-point for the respective seat lies in the range of 0.375 m to 0.495 m.

3. The seating arrangement of claim 2, wherein the front seat is mounted such that a distance measured between a heel contact point and a referenced H-point for the respective seat lies in the range of 0.4 m to 0.45 m.

4. The seating arrangement of claim 2, wherein the front seat is mounted such that a distance measured between a heel contact point and a referenced H-point for the respective seat lies in the range of 0.4 m to 0.45 m.

5. The seating arrangement of claim 1, wherein the front seat has a heel contact point referenced H-point and the rear seat has a heel contact point referenced H-point and a stagger distance between the two H-points measured in a longitudinal direction of the passenger vehicle lies in the range of 0.3 m to 0.35 m.

6. The seating arrangement of claim 1, wherein the front seat has a heel contact point referenced H-point and the rear seat has a heel contact point referenced H-point and the two H-points lie on a common horizontal plane.

7. The seating arrangement of claim 1, wherein the front seat is a seat for a driver and the rear seat is a seat for a passenger.

8. The seating arrangement of claim 1, wherein the passenger vehicle has a transversely stepped floor having a front lower part and a rear upper part and both of the front seat and the rear seat are mounted on the rear upper part of the floor.

9. A vehicular seating arrangement for a passenger vehicle comprising:
   a front seat disposed at a first distance above a vehicle floor;

a rear seat disposed at a second distance above the vehicle floor, wherein the second distance is less than the first distance; and respective central longitudinal axes of each respective seat being arranged on opposite sides of a vehicular central longitudinal axis in a staggered relationship, wherein the rear seat is positioned such that a distance measured from the central longitudinal axis of the rear seat to the vehicular central longitudinal axis is less than half the width of the rear seat.

10. The vehicular seating arrangement of claim 9, wherein the front seat is mounted such that a distance measured between a heel contact point and a referenced H-point for the respective seat lies in the range of 0.375 m to 0.495 m.

11. The vehicular seating arrangement of claim 9, wherein the distance from the central longitudinal axis of the front seat at the rear edge of the front seat to the vehicular central longitudinal axis of the passenger vehicle is less than half the width of the front seat.

12. The vehicular seating arrangement of claim 9, wherein the front seat has an upright backrest with an inclination relative to vertical that is less than 23 degrees.

13. The vehicular seating arrangement of claim 9, wherein the front seat has a heel contact point referenced H-point and the rear seat has a heel contact point referenced H-point and a stagger distance between the two H-points measured in a longitudinal direction of the motor vehicle lies in the range of 0.3 m to 0.35 m.

14. The vehicular seating arrangement of claim 9, wherein the front seat has a heel contact point referenced H-point and the rear seat has a heel contact point referenced H-point and the two H-points lie on a common horizontal plane.

15. The vehicular seating arrangement of claim 9, wherein the passenger vehicle has a transversely stepped floor having a front lower part and a rear upper part and both of the front seat and the rear seat are mounted on the rear upper part of the floor.

16. A passenger vehicle comprising:
a transversely stepped floor having a front lower part and a rear upper part;
a front seat; and
a rear seat, wherein both seats are mounted on the rear upper part of the floor on opposite sides of a vehicular central longitudinal axis in a staggered relationship and at least one of the seats is positioned such that a portion of the respective seat overlaps the vehicular central longitudinal axis.

17. The passenger vehicle of claim 16, wherein the front seat is mounted such that a distance measured between a heel contact point and a referenced H-point for the respective seat lies in the range of 0.375 m to 0.495 m.

18. The passenger vehicle of claim 17, wherein the front seat is mounted such that a distance measured between a heel contact point and a referenced H-point for the respective seat lies in the range of 0.4 m to 0.45 m.

19. The passenger vehicle of claim 16, wherein the front seat has an upright backrest with an inclination relative to vertical that is less than 23 degrees.

\* \* \* \* \*